United States Patent [19]
Thaler

[11] Patent Number: 6,115,701
[45] Date of Patent: Sep. 5, 2000

[54] NEURAL NETWORK-BASED TARGET SEEKING SYSTEM

[76] Inventor: Stephen L. Thaler, 12906 Autumn View Dr., St. Louis, Mo. 63146

[21] Appl. No.: 09/371,887

[22] Filed: Aug. 9, 1999

Related U.S. Application Data

[60] Continuation of application No. 08/910,290, Aug. 13, 1997, Pat. No. 6,018,727, which is a division of application No. 08/323,238, Oct. 13, 1994, Pat. No. 5,659,666.

[51] Int. Cl.$^7$ .................................................. G06F 15/18
[52] U.S. Cl. ............................... 706/16; 706/28; 706/30; 706/46
[58] Field of Search ................................. 706/16, 28, 30, 706/46

[56] References Cited

U.S. PATENT DOCUMENTS

| | | | |
|---|---|---|---|
| 4,591,980 | 5/1986 | Huberman et al. | 712/16 |
| 4,941,122 | 7/1990 | Weideman | 706/20 |
| 5,058,184 | 10/1991 | Fukushima | 706/20 |

(List continued on next page.)

FOREIGN PATENT DOCUMENTS

| | | |
|---|---|---|
| 9104546 | 4/1991 | WIPO . |
| 9217855 | 10/1992 | WIPO . |

OTHER PUBLICATIONS

Eapen, "Neural Network For Underwater Target Detection"; IEEE Conference on Neural Networks for Ocean Engineering, pp. 91–98, Aug. 1991.

Malkoff et al., "A Neural Network Approach To The Detection Problem Using Joint Time–Frequency Distributions"; ICASSP '90, pp. 2739–2742, vol. 5 Apr. 1990.

Dranger et al., "Adaptive Classifiers Using Ontogenetic Neural Networks With Feedback"; 1993 IEEE International Symposium on Circuits and Systems, pp. 2156–2159, vol. 4 May 1993.

(List continued on next page.)

*Primary Examiner*—Tariq R. Hafiz
*Assistant Examiner*—George Davis
*Attorney, Agent, or Firm*—Haverstock, Garrett and Roberts LLP

[57] ABSTRACT

A system and process for readily determining, for a specified knowledge domain in a given field of endeavor, perturbations applicable to an artificial neural network embodying such a specified knowledge domain that will produce a desired output, comprising a first, previously trained, artificial neural network containing training in some problem domain, which neural network is responsive to the presentment of a set of data inputs at the input portion thereof to produce a set of data outputs at the output portion thereof, a monitoring portion which constantly monitors the outputs of the first neural network to identify the desired outputs, and a network perturbation portion for effecting the application of perturbations, either externally or internally, to the first neural network to thereby effect changes in the output thereof. The perturbations may be effected by any number of different means, including by, but not limited to, presentment of new, varied data inputs, alteration or fixed or previously applied data inputs, such as by the introduction of noise to the inputs, relaxation or degradation of the network, and so forth, either randomly or systematically, and may be accomplished autonomously or upon specific external authorization or control. Identification of a desired output establishes an input/perturbation/output mapping relationship from which data inputs (external perturbations) and/or knowledge domain alterations (internal perturbations) that produce the desired output can be determined. The system and process can be employed in some instances and in some embodiments as a target seeking system for use with various design or problem solving applications, and can, in some embodiments, comprise or be comprised of a system and process for autonomously producing and identifying desirable design concepts through utilization of such a target seeking system.

21 Claims, 4 Drawing Sheets

U.S. PATENT DOCUMENTS

| | | | |
|---|---|---|---|
| 5,067,095 | 11/1991 | Peterson et al. | 706/33 |
| 5,150,450 | 9/1992 | Swenson et al. | 706/25 |
| 5,153,923 | 10/1992 | Matsuba et al. | 382/158 |
| 5,155,801 | 10/1992 | Lincoln | 706/20 |
| 5,197,114 | 3/1993 | Skeirik | 706/23 |
| 5,214,715 | 5/1993 | Carpenter et al. | 382/157 |
| 5,226,092 | 7/1993 | Chen | 382/157 |
| 5,235,673 | 8/1993 | Austvold et al. | 706/44 |
| 5,239,593 | 8/1993 | Wittner et al. | 382/158 |
| 5,239,594 | 8/1993 | Yoda | 382/158 |
| 5,241,620 | 8/1993 | Ruggiero | 706/16 |
| 5,299,285 | 3/1994 | Tawel | 706/25 |
| 5,303,328 | 4/1994 | Masui et al. | 706/25 |
| 5,303,329 | 4/1994 | Mead et al. | 706/33 |
| 5,303,330 | 4/1994 | Gersho et al. | 706/16 |
| 5,353,207 | 10/1994 | Keeler et al. | 706/23 |
| 5,398,300 | 3/1995 | Levey | 706/16 |
| 5,416,888 | 5/1995 | Shimokawa | 706/16 |
| 5,422,961 | 6/1995 | Simard | 382/224 |
| 5,424,959 | 6/1995 | Reyes et al. | 706/929 |
| 5,452,400 | 9/1995 | Takahashi et al. | 706/19 |
| 5,465,308 | 11/1995 | Hutcheson et al. | 382/158 |
| 5,481,481 | 1/1996 | Frey et al. | 702/82 |
| 5,500,905 | 3/1996 | Martin et al. | 382/157 |
| 5,581,459 | 12/1996 | Enbutsu et al. | 706/16 |
| 5,588,091 | 12/1996 | Alkon et al. | 706/31 |
| 5,622,171 | 4/1997 | Asada et al. | 706/20 |
| 5,640,494 | 6/1997 | Jabri et al. | 706/25 |
| 5,659,666 | 8/1997 | Thaler | 706/16 |
| 5,668,717 | 9/1997 | Spall | 706/23 |
| 5,692,107 | 11/1997 | Simoudis et al. | 706/12 |
| 5,701,400 | 12/1997 | Amado | 706/45 |
| 5,729,662 | 3/1998 | Rozmus | 706/20 |
| 5,740,324 | 4/1998 | Mathur et al. | 706/16 |
| 5,845,271 | 12/1998 | Thaler | 706/16 |
| 5,852,815 | 12/1998 | Thaler | 706/16 |
| 5,852,816 | 12/1998 | Thaler | 706/20 |

OTHER PUBLICATIONS

Hollis et al, "A Neural Network Learning Algorithm, Tailored for VLSI Implementation", IEEE Transactions on Neural Networks, Sep. 1994.

Oh et al, "Query Based Learning in a Multilayered Perception in the Presence of Data Filter", Proceeding of the 1st Intern. Forum on Application of Neural Networks to Power Systems, IEEE Jul. 1991.

Babri et al., "Deep Feedforward Networks: Application to Pattern Recognition", IEEE ICNN, Jun. 1996.

Ji et al, "Experimental Study of Direct, Adaptive SPSA Control System with Diagonal Recurrent Neural Network Controller", IEEE Proceedings of the Southeastern '96. Bringing Together Education; Science and Technology, Apr. 1996.

Hewett et al, "Teaching Students to Model Neural Circuits and Neural Networks Using an Electronic Spreadsheet Simulator", Behavior Research Methods, Instruments & Computers, vol. 17, No. 2, pp. 339–344, Apr. 1985.

Caudill, M., "Neural Nets Smarts to Spreadsheets Slowly", BYTE, vol. 18, No. 1, pp. 221–222, Jan. 1993.

Lead et al, "A Hybrid Connectionist Expert System to Solve Classification Problems" IEEE Proceedings of Computer in Cardiology, Sep. 1993.

Ekong et al, "Fault Tolerant Neural Networks For Control Systems"; IEEE Conference on Communications, Computers & Power in the Modern Environment, pp. 269–275, May 1993.

Saga et al, "Self–Supervised Learning Model"; Fujitsu Scientific & Technical Journal, 29, 3, pp. 209–216, Sep. 1993.

Tuazon et al, "A New Digital Neural Network And Its Application"; 1993 Canadian Conference on Electrical & Computer Engineering, p. 481–485, vol. 1, Sep. 14–17, 1993.

Antonini, "Spreadsheet Simulation Of Artificial Neural Networks"; IJCNN–91–Seattle, p. 910, vol. 2.

Freedman et al, "Expert Systems In Spreadsheets: Modeling The Wall Street User Domain"; The First Int'l Conference on AI on Wall Street, pp. 296–301.

Walter et al, "A Spreadsheet Method For Studying Neural Networks", Proceedings of the 1990 Symposium on Applied Computing, pp. 42–44.

NEURAL NETWORK-BASED TARGET SEEKING SYSTEM

This application is a continuation of application Ser. No. 08/910,290, filed Aug. 13, 1997, U.S. Pat. No. 6,018,727, which is a divisional of application Ser. No. 08/323,238, filed Oct. 13, 1994, U.S. Pat. No. 5,659,666.

BACKGROUND OF THE INVENTION

The present invention relates, generally, to a system and process for readily determining, for a specified knowledge domain in a given field of endeavor as represented in a neural network, perturbations applicable to such specified knowledge domain that will produce a desired output, and employs neural network-based technology to quickly and easily arrive at a determination of the particular perturbation-output mapping relationship associated with or required to produce the desired output. Typically, such system and process can be utilized to determine those input patterns to a neural network, which input patterns may be representative of designs, concepts, or plans of action, that will produce a desired result within the particular knowledge domain, and operates to determine the particular input-output mapping relationship associated with or required to produce the desired result. Such system can be employed in some instances and in some embodiments as a target seeking system for use with various design or problem solving applications, and can, in some embodiments, also comprise or be comprised of a system and process for autonomously producing and identifying desirable design concepts.

Prior to this invention, artificial neural network (ANN) emulations of biological systems were used for tasks such as pattern recognition, neural control, and the generalization of experimental data. The present system represents a new approach and a new application of ANN's in which the system functions to permit a user to specify desired outputs or results for a given design or problem solving application and to thereafter obtain identification of system perturbations that would produce the desired output. Such system perturbations may be external to the ANN (e.g., changes to the ANN data inputs) or internal to the ANN (e.g., changes to weights, biases, etc.) By utilizing neural network-based technology, such identification of required perturbations can be achieved easily, quickly, and, if desired, autonomously.

SUMMARY OF THE INVENTION

The system comprises a first, previously trained, artificial neural network containing training in some problem domain, which neural network is responsive to the presentment of a set of data inputs at the input portion thereof to produce a set of data outputs at the output portion thereof, a monitoring portion which constantly monitors the outputs of the first neural network to identify desired, targeted outputs, and a network perturbation portion for effecting the application of perturbations, either externally or internally, to the first neural network to thereby effect changes in the output thereof. The perturbations may be effected by any number of different means, including by, but not limited to, presentment of new, varied data inputs; alteration of fixed or previously applied data inputs, such as by the introduction of noise to the inputs; relaxation or degradation of the network; and so forth, either randomly or systematically, and may be accomplished autonomously or upon specific external authorization or control. Identification of a desired targeted output establishes a particular perturbation-output mapping relationship from which data inputs (external perturbations) and/or knowledge domain settings (internal perturbations) that produce the desired output can be determined.

DISCUSSION OF THE PRIOR ART

As is discussed in more detail in application Ser. No. 08/910,290, U.S. Pat. No. 6,018,727 and its parent application Ser. No. 08/323,238, U.S. Pat. No. 5,659,666, which are incorporated herein by reference, ANN's have previously been utilized for various purposes, such as for pattern recognition in accordance with which the ANN's attempt, based upon their training, upon presentment of a set of data inputs to the ANN, to match thereto a standard output pattern, as known from training exemplars. It has, however, not generally been possible to specify a desired standard output and to easily determine for such desired output, apart from the known training exemplars, what inputs would produce such desired standard output, especially when the ANN includes one or more hidden layers.

As is further discussed in application Ser. No. 08/910,290, U.S. Pat. No. 6,018,727 and its parent application Ser. No. 08/323,238, U.S. Pat. No. 5,659,666, the inventor has demonstrated that the application of perturbations to the inputs or weights of a previously trained ANN may produce novel outputs if the vector completion process fails to activate an output vector encountered during the network's training. Such neural networks can produce non-standard outputs which differ from the standard outputs as established through use of the training exemplars, which non-standard outputs generally take the form of some combination of known training outputs and generally emulate the environment in which the neural network was trained.

Thus, one can employ a neural network system, in which a component neural network has been trained to generate a set of performance characteristics in response to presentment of an input data set, representative of a device or object design to produce sets of varying performance characteristic outputs as external perturbations are applied to the neural networks. Such generated performance characteristic outputs will, however, still be subject to the unaltered constraints contained within the weights and biases associated with the neural network. Correspondingly, a variety of performance characteristic outputs can be produced by subjecting the neural network to internal perturbations, instead of to external perturbations. In such event, even if the network inputs are maintained fixed or constant, the network alteration or degradation resulting from such internal perturbations, such as alterations in the weights and biases associated with individual neurons, will result in the production of differing performance characteristic outputs, which outputs will tend to be novel and differ from those outputs that would be produced had network alteration or degradation not occurred, but which will still be subject to unaltered constraints that were not affected by the internal perturbations.

Applicant's parent application Ser. No. 08/323,238, U.S. Pat. No. 5,659,666, and his application Ser. No. 08/910,290, U.S. Pat. No. 6,018,727 are directed to certain aspects of the systems disclosed therein, and, in particular, to ANN based systems which operate to produce and/or identify potentially desirable outputs as they are produced by the ANN while it undergoes perturbations and/or to develop non-standard design concepts within a predefined field of endeavor in which the ANN has been trained. The present application is directed to another aspect of the systems disclosed in such noted applications, namely, to an ANN based system that can monitor the output of a previously trained ANN to identify correspondences with or differences from predetermined target criteria associated with the monitoring portion of the system for various purposes, such as to identify a particular desired output and to determine the particular perturbation-output mapping relationship associated with or required to produce such desired output. From the specification by a user of a target output, it is thus possible to determine an input set that would produce such output. Such neural network based systems can be utilized for various purposes, such as to produce music or musical themes for some purpose, or to design some device such as a coffee mug or automobile, or to produce a process planning operation, or to solve a problem, such as to seek a target figure of merit in a target seeking application of the system, and for many other applications.

Known ANNs have obtained a relatively high degree of precision in some areas such as in input-output mapping. The present invention makes use of such precision mapping, but goes beyond the limitations thereof in that it also teaches and makes use of perturbations applied to the system to produce useful information and to determine particular relationships relative to the knowledge domain of the ANN and its perturbation status, which relationships may have previously been unknown, unrealized, or unsuspected. It will be appreciated that ANN's can be readily trained by various techniques using training examplars, but such known training examplars represent only a limited number of perturbation-output mapping relationships that may exist for any particular neural network once its training has been completed, especially for large, multilayered, or complex neural networks, and are applicable only to the internally unperturbed state of the neural network.

The present invention permits the ready determination of perturbation-output mapping relationships as perturbations are applied, either externally or internally, to a previously trained neural network, and thus provides an advantageous method for identifying system inputs and/or system or process design or step alterations that produce targeted output characteristics, specifications, or steps of or associated with, a design or a control process. The information produced with the present system can be stored for later use to effect or control a process or operation or the like and/or can be used in the system's own autonomous operation to take other actions or to modify the output or outputs that have been produced in some desired fashion. Thus the present system provides another tool, and a very broad based tool, for doing design or creative work, including as part of target seeking applications.

It will be appreciated that the ability of the system to internally modify the network in a myriad of ways allows for vast numerical superiority in the number of viable concepts that may be produced. The present arrangement of system elements allows for complete autonomy in this task.

OBJECTS OF THE INVENTION

It is a principal object of the invention to teach the construction and operation of a novel neural network-based system for identifying desired output concepts and for determining perturbation-output mapping relationships associated therewith within a given field of endeavor.

Another object is to perturb artificial neural networks, previously trained, in order to identify useful or desirable perturbation-output mapping relationships.

Another object is to monitor information that is output from a perturbed neural network, in response to input information and perturbations, in order to identify perturbation factors that would produce desired outputs.

Another object is to produce controllable changes in a previously trained neural network by controlling the extent of perturbations applied thereto.

These and other objects and advantages of the present invention will become apparent after considering the following detailed specification of preferred embodiments in conjunction with the accompanying drawings wherein:

BRIEF DESCRIPTION OF THE DRAWINGS

For purposes of comparison with Applicant's previously noted applications, FIG. 2 hereof is essentially identical to FIG. 16 of such applications, but includes an additional block indication 200 which is shown comprising elements 102 and 120–130 of such noted FIG. 16. FIG. 1 hereof is similar to FIG. 2 hereof, including the block 200, but does not include any specific structure or components within block 200. FIGS. 3A and 3B are identical to FIGS. 17A and 17B, respectively, of Applicant's previously noted applications, except for the renumbering of the figures.

DETAILED DESCRIPTION OF PREFERRED EMBODIMENTS

For purposes of consistency and ease of cross-reference, the reference numbers of this application correspond generally, although not necessarily identically, to like reference numbers as utilized in Applicant's previously noted applications.

Figure 1:
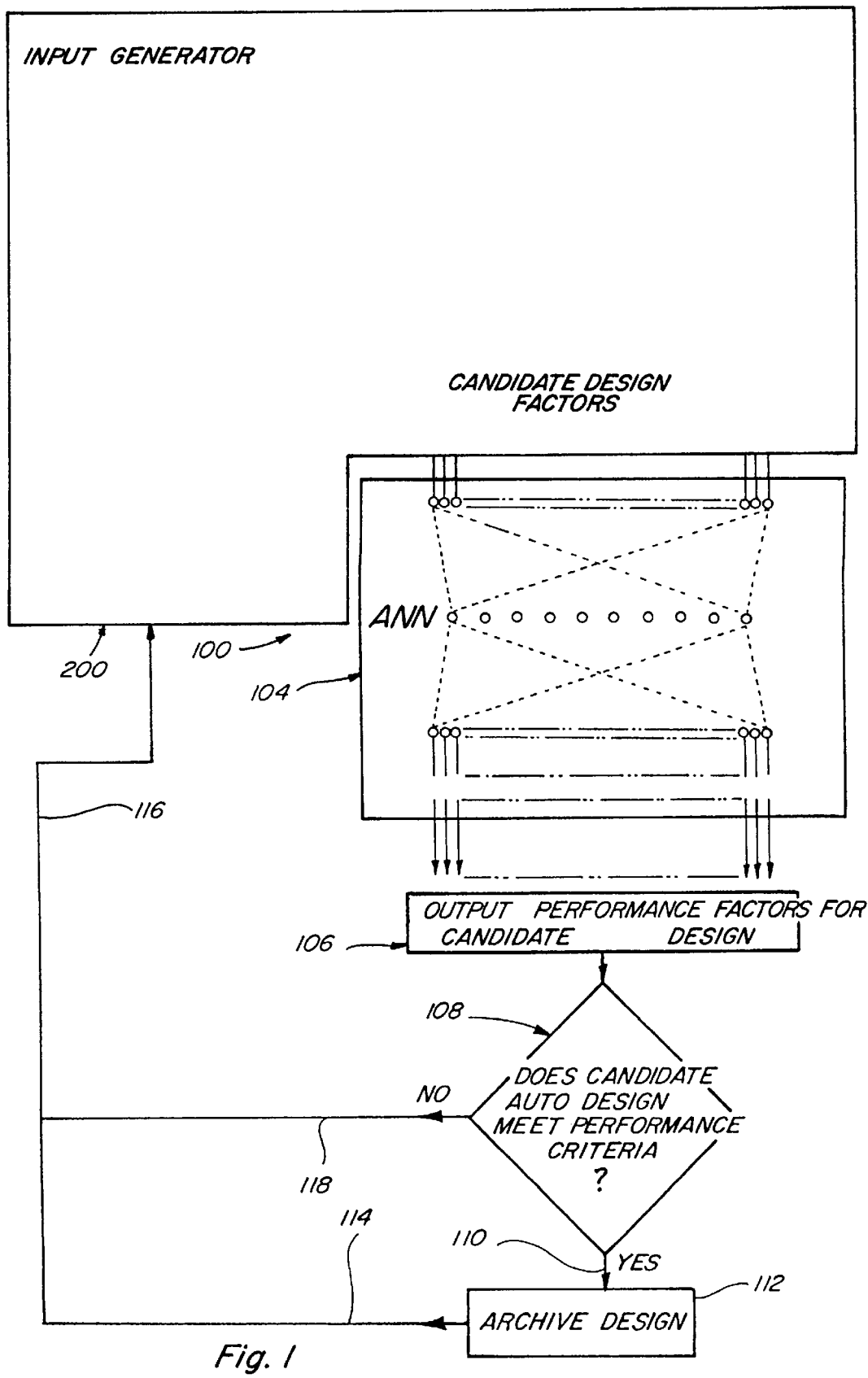
FIG. 1 depicts an embodiment of the subject artificial neural network-based target seeking system that utilizes a network perturbation portion to effect external network perturbations and illustrates a manner in which candidate designs that produce predetermined output characteristics can be readily determined and identified.

Referring now to the drawings, FIG. 1 depicts a preferred embodiment of a target seeking system 100 that includes an ANN 104 which has one or more hidden or intermediate layers and which has been previously trained in a predefined field of endeavor, a monitor and decision portion including blocks 106 and 108, and a network perturbation portion identified as block 200, which network perturbation portion in this instance is positioned to effect external perturbations and to act as an input generator for the ANN 104.

Figure 2:
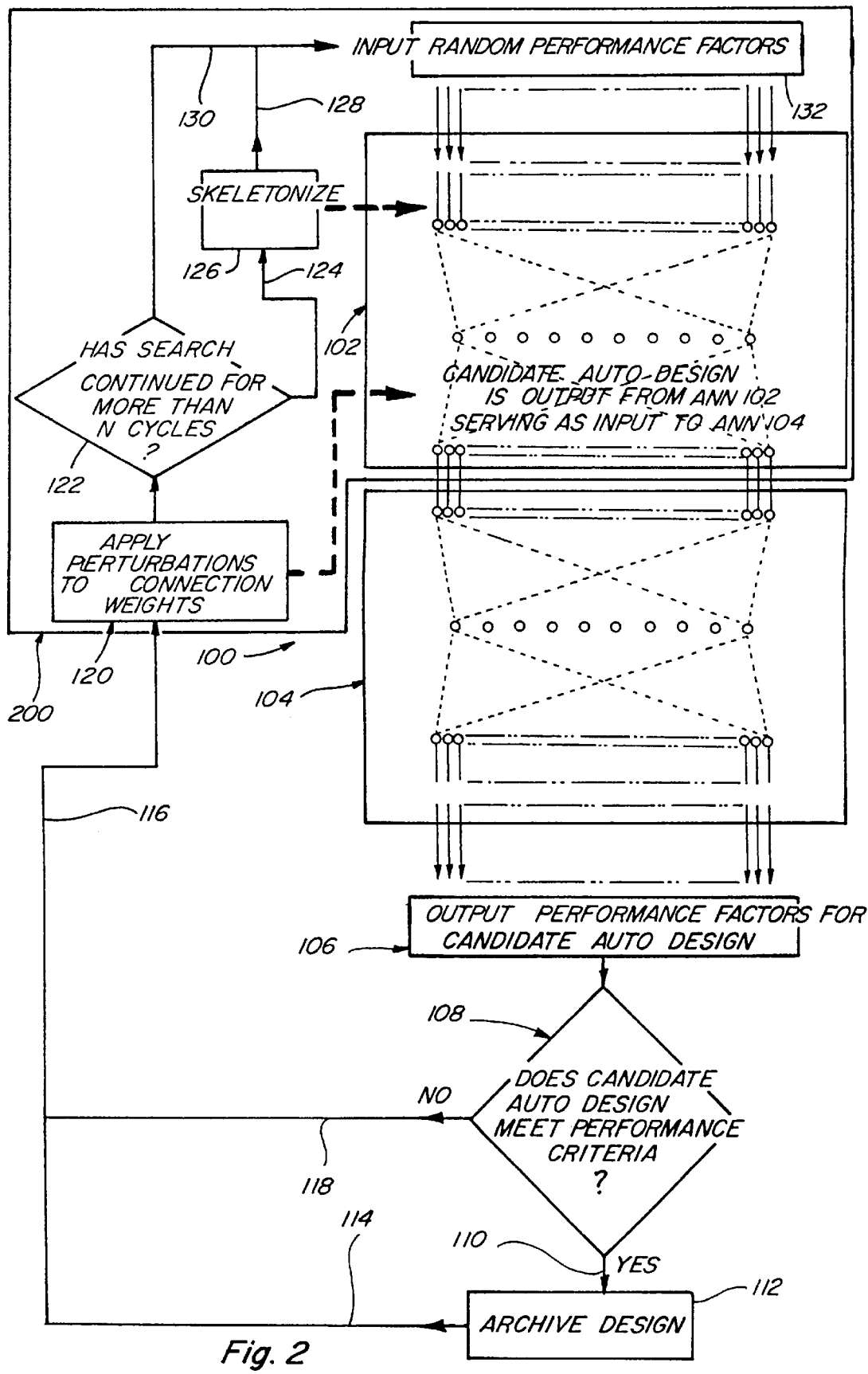
FIG. 2 depicts a particularized embodiment of FIG. 1 wherein the network perturbation portion includes a second artificial neural network for producing candidate automobile designs and wherein the system can operate autonomously to determine and identify designs whose performance characteristics satisfy predetermined criteria.

FIG. 2 is essentially identical to FIG. 16 of Applicant's previously noted applications except for the addition of block indication 200, which block identifies a network perturbation or input generator portion of the system and is depicted including a variety of components that are employed in the particular, specific embodiment depicted therein to generate candidate design inputs for ANN 104. The specific embodiment of FIG. 2 has been found to be advantageous as an autonomous design system which is also a target seeking system. As is discussed in greater detail in Applicant's previously noted applications, the use of a second ANN 102 can be beneficially significant in effecting such an autonomous design system.

The intent of the particular, specific embodiment of FIG. 2 is to design an automobile or car in terms of its major specifications and characteristics, and to employ an ANN based target seeking system in doing so. The design is based on some notions as to the automobile's desired, performance characteristics, such as operational performance factors, insurance coverage, warranties, probability of theft, and anticipated user satisfaction. In creating the subject embodiment, 29 input factors were utilized as possible inputs to the previously trained ANN 102 of block 200 in FIG. 2, which ANN 102 forms part of the network perturbation or input generator portion 200 of the target seeking system 100 and operates to generate candidate auto designs as outputs thereof, which candidate auto designs are then supplied to the input portion of ANN 104. The ANN 104 thereafter operates to map sets of candidate auto design specifications to sets of performance characteristics associated with the candidate auto design. In the particular embodiment of FIG. 2, both ANN's 102 and 104 utilize a 29-10-29 nodal architecture, although it will be recognized by those skilled in the art that many other noted architectures could also be employed.

The target seeking system 100 of both FIGS. 1 and 2 is shown as including a previously trained ANN 104 which has a hidden or intermediate layer and which operates to produce, in response to a given candidate automobile design, an output representative of a variety of automobile performance factors, and an output monitor 106 with an associated decision block 108 for monitoring the output of the ANN 104 and determining whether the output produced by the ANN 104 satisfies predefined target criteria, which, in this case, is a set of predefined performance characteristics. As depicted, system operation proceeds in accordance with the determination made by block 108 as to whether or not a desired output of the ANN 104 has been detected. If a desired output has not been produced, notification will be provided to network perturbation portion 200, such as is indicated by the "NO" output from decision block 108 and paths 118 and 116. On the other hand, if a desired output has been produced by ANN 104, the candidate design will be archived, as is indicated by connection of the "YES" output from decision block 108 to the Archive Design block 112 via path 110. After the candidate design is then archived as a "good" design, i.e., a design that yields the desired output performance characteristics, additional "good" designs can further be sought, if desired, by providing notification to the network perturbation portion 200 via paths 114 and 116.

As is explained and discussed in Applicant's previously noted applications, the perturbation of an ANN may be the result of a combination of different factors such as (a) weights, (b) biases, (c) activations, (d) external input signals, (e) internal input signals to any given unit within the network, or (f) internal output signals from any given unit within the network. As is also explained and discussed, the parameters a–f may be perturbed by various means such as by (1) successively setting their values to some constant value such as zero; (2) successively adding some random number as obtained with a random number table to their original values; (3) successively changing their values by replacing them with random numbers obtained from a random number table; (4) multiplying their values by a time-dependent factor usually with some decay constant; (5) successively adding positive and negative random numbers obtained through a random number table to allow these parameters to perform a random walk about the original values; (6) adding numbers which obey certain statistical frequency distributions of the form where the probability of choosing such a number obeys a probability function; (7) adding numbers which obey set time-dependent statistical distributions; and/or (8) progressively multiplying any of the above factors by some gradually increasing amplitude factor so as to smoothly transition the ANN from an original constrained condition, implicit within its training, to progressively relax constraints as the weights and biases stray from their training values. As is further explained and discussed, it has also been found that applying such perturbating influences to neurons which have not been fully recruited into the ANN's mapping or training can be an effective way of perturbing the ANN in some instances and for some applications.

Block 200 thus represents a network perturbation portion that can operate to effect perturbation of ANN 104 by or in any of such noted factors and by or through any acceptable mechanisms or elements that can effect such perturbation.

With particular reference to FIG. 2, block 200 is depicted as including a particular preferred set of components or elements that may be employed in one preferred embodiment to effect external perturbations of ANN 104. Path 116 is shown operatively communicating the "NO" output from decision block 108, provided over path 118, and the output from "Archive Design" block 112, provided over path 114, to ANN 102 of block 200 through a block 120 labeled "Apply Perturbations to Connection Weights", which block 120 can operate to provide internal and/or external perturbations to ANN 102. The dotted line extending between block 120 and ANN 102 represents the effectation by block 102 of internal perturbations to ANN 102.

Block 120 is also shown as being connected to a decision block 122 labeled "Has Search Continued For More Than N Cycles?", which block 122 has a first output 124 that flows to block 126 labeled "Skeletonize" and a second output 130 that flows to block 132 labeled "Input Random Performance Factors". Such elements depict certain specific manners in which external perturbations can be applied to ANN 102, as will be described in more detail hereinafter.

Outputs from both blocks 122 and 126 may be applied through paths 130 and 128 to block 132, whose outputs are connected to the inputs of ANN 102 to effect an external perturbation of ANN 102. Alternatively, as depicted by the dotted line extending between block 126 and ANN 102, block 126 can effect an external perturbation of ANN 102 apart from block 132.

In operation, the inputs of ANN 102 can thus be fed values, such as from a random number table, by block 132. As each of the 29 component vectors applied as inputs to ANN 102 are propagated through ANN 102, physically realizable automobile designs are produced at its outputs, prescribed in terms of 29 design specifications. Each set of outputs from ANN 102 represents a candidate car design that is then fed to the inputs of ANN 104 wherein feed forward propagation produces the output performance characteristics that would result from that particular set of candidate car design specifications. These output performance characteristics as presented at block 106 are then compared at block 108 with the desired target characteristics to determine whether or not the target has been met and an appropriate design has been obtained. If the target performance characteristics have been met, the car design is archived at block 112 and may, if desired, be displayed on some means such as a cathode ray tube.

If the performance characteristics for the candidate car design do not meet the target requirements, the "NO" output produced at block 108 is provided via paths 118 and 116 to block 120 of block 200. Block 120 thereafter operates to effect the perturbation of ANN 102 to generate another candidate design to be evaluated in like fashion by ANN 104.

Figure 3A:
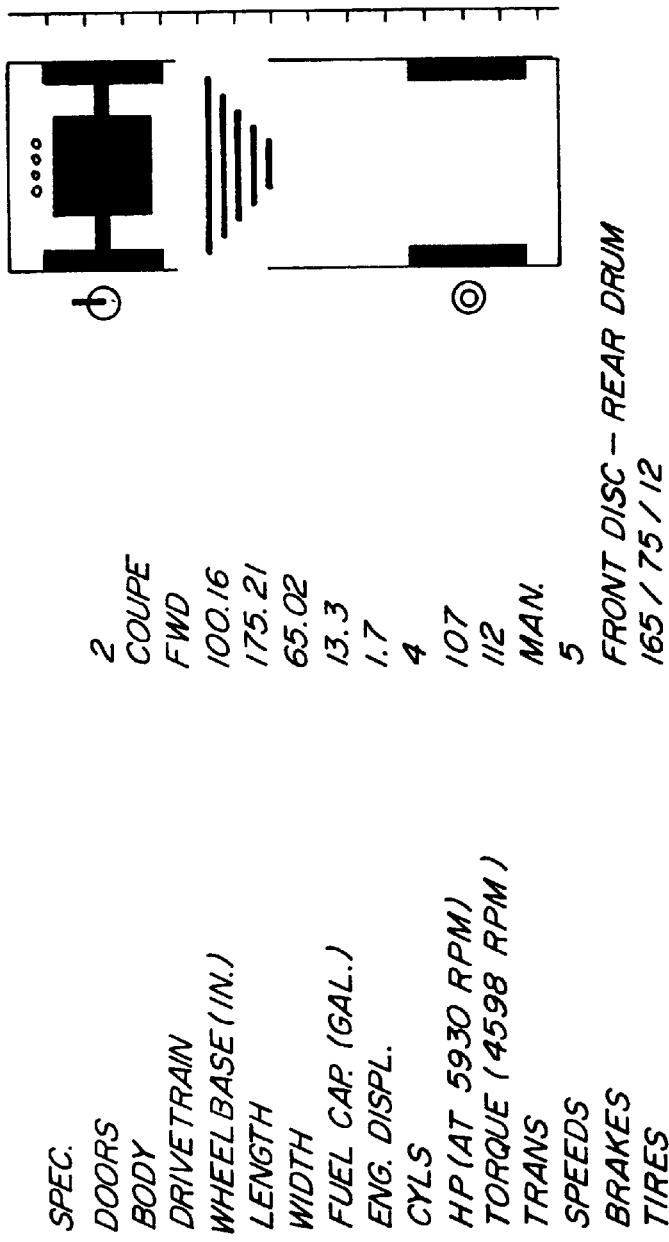
FIGS. 3A and 3B show two automobile designs produced by the system of FIG. 2, including a design (1) to achieve at least 35 MPG, cost less than $25,000.00 and have a favorable rating in terms of user satisfaction, and design (2) which is an automobile capable of accelerating to 60 MPH in less than eight (8) seconds and able to achieve a top speed of at least 150 MPH.
Figure 3B:
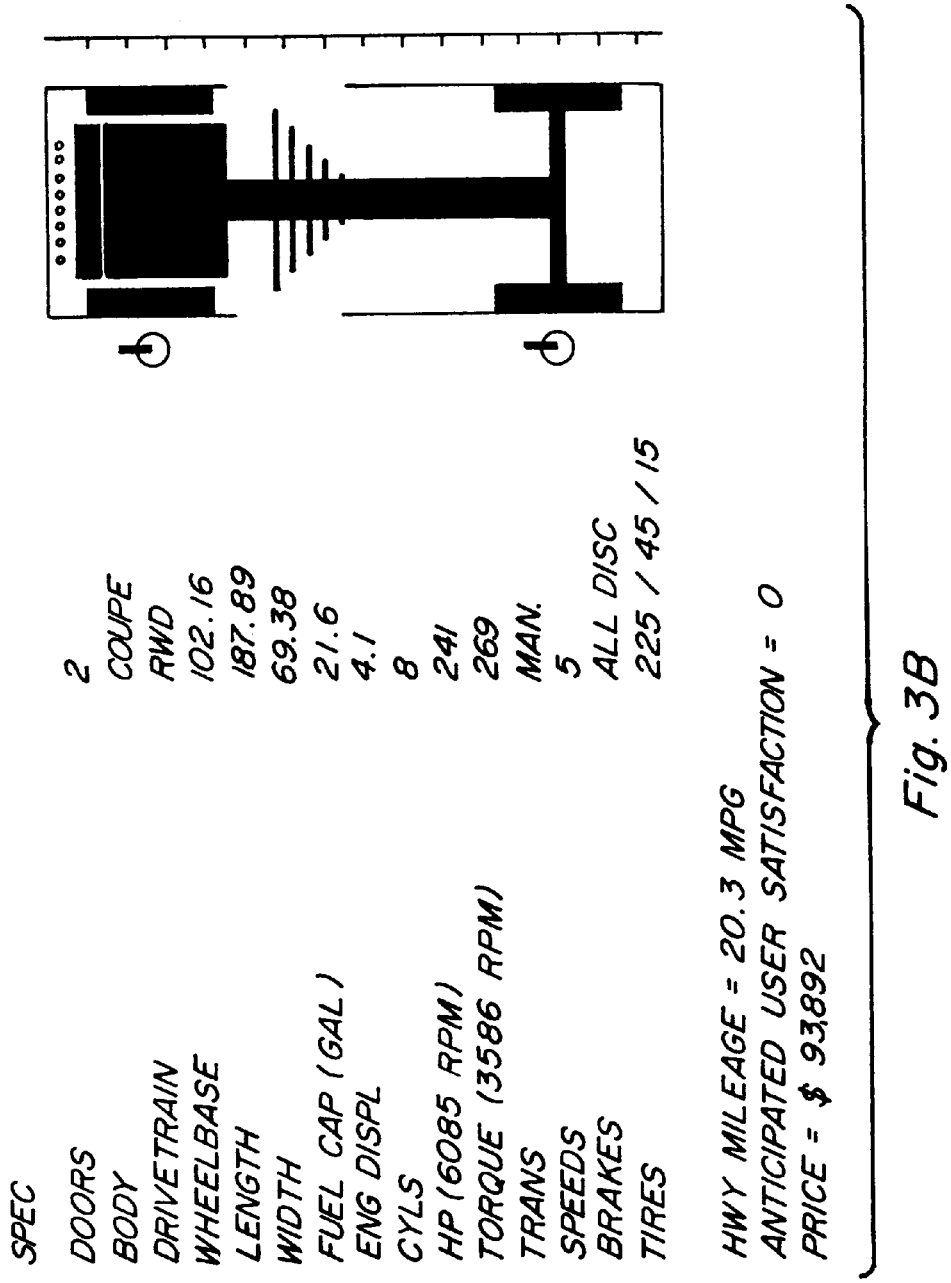

FIGS. 3A and 3B depict two possible candidate car designs such as might be generated by the FIG. 2 embodiment along with several selected performance characteristics of the type that might be specified as targeted performance characteristics. For example, FIG. 3A shows the design of a car which would satisfy performance characteristics of possessing a highway mileage of at least 35 MPG, a retail price of at most $25,000, and a projected user satisfaction of one on a (1), 0, (−1) rating scale that has been synthesized by the described embodiment. FIG. 3B, on the other hand, shows the design of a car which would satisfy performance characteristics of taking less than 8 seconds to accelerate from zero to 60 mph with a top speed of not less than 150 mph. If the performance characteristics for FIG. 3A were applied to the design of FIG. 3B, however, it is clear that the FIG. 3B design would not produce the targeted characteristics.

It should be noted that in the case of FIG. 3A, the system of FIG. 2 has produced a physically realizable candidate car design by carrying out vector completion on the input vector consisting of random components as well as internal perturbations applied to ANN 102 and that properties such as curb weights and tire size are realistically scaled with factors such as horsepower. Myriad nonsensical specifications have been eliminated within ANN 102 via the soft constraints offered by the connection strengths within the trained neural network. ANN 104 then operates to produce the performance characteristics for the candidate design, which performance characteristics are compared against predetermined target performance characteristics calling for a highway mileage of at least 35 MPG, a retail price of at most $25,000.00, and a projected user satisfaction of one. Since the performance characteristics for the candidate design of FIG. 3A satisfy the target performance characteristics, the car design of FIG. 3A would be archived for further use.

If, instead of the three (3) noted performance characteristics of FIG. 3A, numerous other or additional performance criteria were specified as target criteria, search time for the target seeking system would likely be extended, and might be more extended than is desirable, especially if a large number of design specifications are employed in the candidate designs. With the particular embodiment of FIG. 2, which provides for autonomous generation of candidate designs, it is possible to somewhat limit or simplify search efforts, as is hereinafter discussed.

If after a predetermined number of forward propagations, such as ten propagations through ANN 102, the target performance criteria have not been met, an output can be provided over path 124 from block 122 to effect the controlled pruning of weights from ANN 102 by block 126 in an attempt to narrow the search. In such a case, weights can be removed one by one from ANN 102, while propagating a number of randomized input vectors through the entire system 100 to see if the ANN 104 output will fall within a predetermined envelope of performance values that blanket the desired range. Should a weight be removed which generates ANN outputs outside this range, it can be replaced. Should a more radical automobile design be required, systematic increase of the amplitude of the perturbations applied to the connection weights of ANN 102 could be made, depending upon the ANN 104 to predict the performance of such hypothetical automobiles.

It thus will be appreciated by those skilled in the art that block 200 and the components thereof thus operate to effect external perturbation of ANN 104 by providing to ANN 104 sets of inputs representative of candidate designs. In the particular embodiment of FIG. 2, the network perturbation portion represented by block 200 makes use of a second ANN 102 and related components to realize an autonomous design and target seeking system. The network perturbation portion need not be so elaborate or autonomous, however, and can take many forms to externally perturb ANN 104. It will be further appreciated that, just as ANN 102 can be internally perturbed, such as by block 120 in FIG. 2, so ANN 104 can likewise be internally perturbed by the network perturbation portion. It will also be obvious to those skilled in the art that the present invention can be used for many purposes other than the limited purposes described herein.

Thus there has been shown and described a novel system and process for readily determining, for a specified knowledge domain in a given field of endeavor, perturbations applicable to an artificial neural network embodying such a specified knowledge domain that will produce a desired output, and it has been shown how such a system can be employed in some instances and in some particular embodiments as a target seeking system for use with various design or problem solving applications and for autonomously producing and identifying desirable design concepts. Many changes, modifications, variations and other uses in applications for the subject system and process will suggest themselves to those familiar with the art. All such changes, modifications, variations and other uses in applications which do not depart from the spirit and scope of the invention are deemed to be covered by the invention which is limited only by the claims which follow.

What is claimed is:

1. An artificial neural network-based system for determining, for a specified knowledge domain in a given field of endeavor as represented in a neural network, a sought-for set of perturbations applicable to such knowledge domain that will produce a desired targeted result, comprising an artificial neural network that has an input layer, an output layer, and at least one hidden layer, and which is operable to produce outputs from said output layer when inputs are supplied to the input layer of said artificial neural network, said artificial neural network having been previously trained in accordance with training exemplars in a predefined field of endeavor to establish a particular knowledge domain therein, a network perturbation portion for iteratively perturbing said artificial neural network to effect iterative changes, subject to design constraints of the artificial neural network that remain unperturbed, in the outputs produced by said artificial neural network, the combined set of perturbations applied to said artificial neural network in any given iteration constituting a candidate set of perturbations, and a monitor portion associated with said artificial neural network to observe said data outputs produced by the artificial neural network in response to candidate sets of perturbations, said monitor portion including a comparator portion that operates to identify from among the observed data outputs being produced by the artificial neural network certain data patterns in said observed data outputs which satisfy predefined target criteria, identification of a data output that satisfies the predefined criteria determining a particular perturbation-output mapping relationship and establishing the candidate set of perturbations that has produced the desired targeted result as the sought-for set of perturbations.

2. The system of claim 1 wherein the monitor portion includes an archive portion to archive said sought-for set of perturbations.

3. The system of claim 2 wherein the network perturbation portion includes a data input generator portion for introducing external perturbations to said previously trained artificial neural network to vary the particular pattern of inputs as presented at the input portion of said previously trained artificial neural network to thereby establish, upon the production of an output in response to the particular pattern of inputs as presented, an input-output data pairing relationship.

4. The system of claim 3 wherein the predefined target criteria have been selected to represent a particular desired pattern within a data output from said artificial neural network, whereby, upon satisfaction of said predefined criteria, the determined input-output pairing relationship identifies a set of input data that represents the sought-for set of perturbations.

5. The system of claim 3 wherein said data input generator portion includes a neural network portion for generating and providing varied inputs to said previously trained artificial neural network, said neural network portion including a second previously trained neural network.

6. The system of claim 3 wherein sets of external perturbations are representative of candidate designs and said outputs produced in response thereto represent performance characteristics of said candidate designs.

7. The system of claim 2 wherein the network perturbation portion includes means for introducing internal perturbations to said previously trained artificial neural network to vary the operational process of said previously trained artificial neural network to thereby establish, upon the production of an output in response to the particular set of internal perturbations as effected in said artificial neural network, a perturbation-output data pairing relationship.

8. The system of claim 7 wherein the predefined criteria have been selected to represent a particular desired pattern within a data output from said previously trained neural network, whereby, upon satisfaction of said predefined criteria, the determined perturbation-output pairing relationship identifies an operational process that results in the data output that satisfies such predefined criteria.

9. The system of claim 7 wherein sets of internal perturbations are representative of candidate process steps and said output produced in response thereto represents performance characteristics of said candidate process steps.

10. The system of claim 1 wherein said network perturbation portion is operable to effect perturbations of said previously trained neural network in a substantially random manner.

11. The system of claim 1 including a storage medium associated with said monitor portion for retaining and storing data representative of said established perturbation-mapping relationships.

12. The system of claim 11 wherein said data stored by said storage medium includes data representative of the inputs supplied to said input layer of said artificial neural network.

13. The system of claim 1 including a system output portion associated with said monitor portion for receiving data representative of said established perturbation-output mapping relationships and formatting said data for use in external systems.

14. The system of claim 13 wherein said data received by said system output portion includes data representative of the inputs supplied to said input layer of said artificial neural network.

15. A method for determining, for a specified knowledge domain in a given field of endeavor as represented in a neural network, a sought-for set of perturbations applicable to such knowledge domain that will produce a desired targeted result, comprising the steps of:

(a) providing an artificial neural network, said artificial neural network having been previously trained in accordance with a set of given training exemplars in the predefined field of endeavor and having an input portion, an output portion, at least one hidden layer, and a particular established knowledge domain for the predefined field of endeavor, (b) perturbing said previously trained artificial neural network to effect production of a data output thereby, (c) monitoring the neural network to detect the data output produced thereby in response to the set of perturbations applied thereto and determining whether or not such data output satisfies predefined target criteria and either (i) proceeding to step (b) if the predefined target criteria are not satisfied, or (ii) archiving the set of perturbations applied to said artificial neural network.

16. The method of claim 15 wherein step (b) includes externally perturbing said artificial neural network.

17. The method of claim 16 wherein step (b) includes providing a second artificial neural network operable to produce candidate sets of data for presentment to said first artificial neural network.

18. The method of claim 17 wherein said archived set of perturbations corresponds to the candidate set of data that results in the data output that satisfies the predefined target criteria.

19. The method of claim 15 wherein step (b) includes the step of:

introducing external perturbations to said previously trained artificial neural network to vary the particular pattern of inputs as presented at the input portion of said previously trained artificial neural network to thereby establish, upon the production of an output in response to the particular pattern of inputs as presented, an input-output data pairing relationship.

20. The system of claim 19 wherein the predefined target criteria have been selected to represent a particular desired pattern within a data output from said previously trained neural network, whereby, upon satisfaction of said predefined target criteria, the determined input-output pairing relationship identifies a data input that results in the data output that satisfies such predefined target criteria.

21. The method of claim 20 wherein step (b) includes internally perturbing said artificial neural network.

* * * * *